Oct. 25, 1966  R. CHARPENTIER ETAL  3,280,555
GAS TURBINE PLANT
Filed Dec. 10, 1963  3 Sheets-Sheet 1

INVENTORS
Rene Charpentier
Andre Marque Georges-Francois
Tadeusz Zaba

BY Pierce, Schiffler & Parker
ATTORNEYS

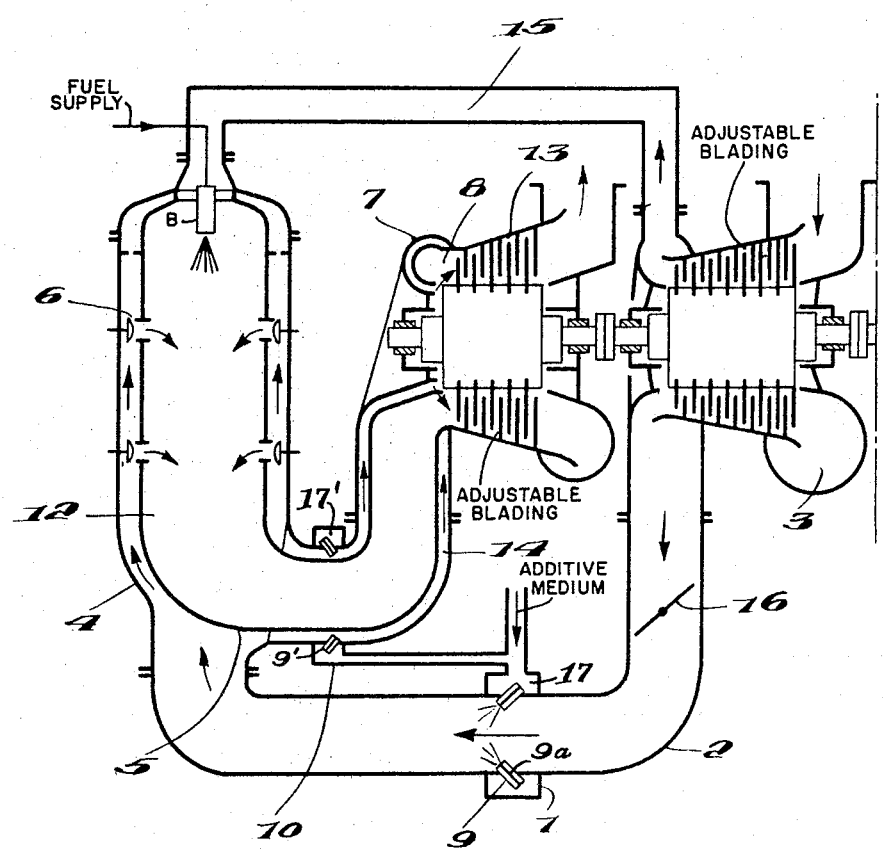

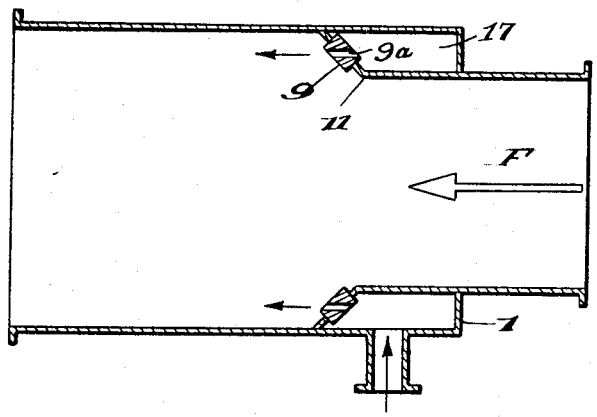
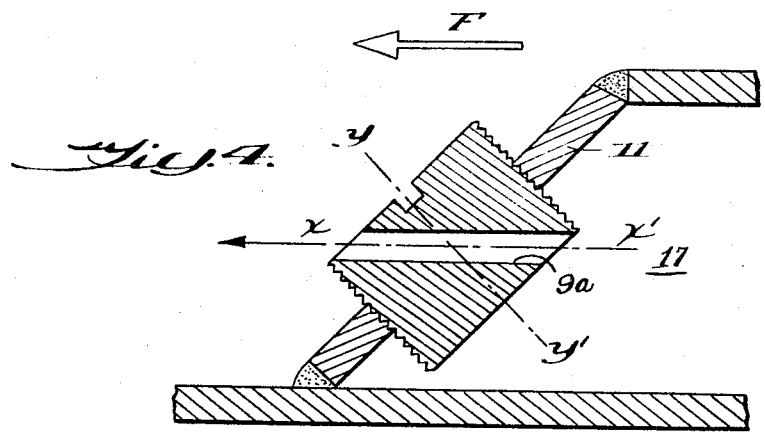
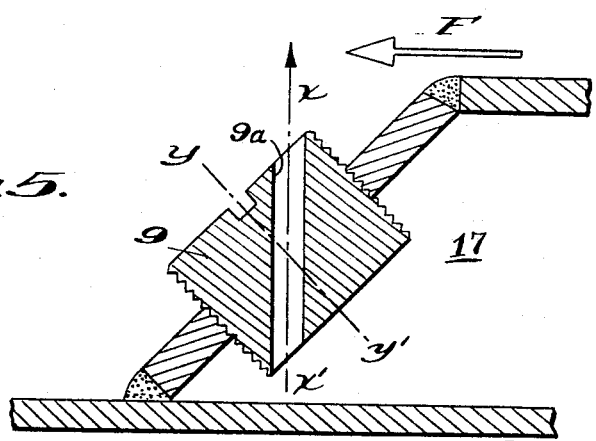

United States Patent Office 3,280,555
Patented Oct. 25, 1966

3,280,555
GAS TURBINE PLANT
Rene Charpentier and Andre Marque Georges-Francois, Paris, France, and Tadeusz Zaba, Wettingen, Switzerland, assignors to Aktiengesellschaft Brown, Boveri & Cie, Baden, Switzerland, a joint-stock company
Filed Dec. 10, 1963, Ser. No. 329,495
Claims priority, application France, Dec. 11, 1962, 918,235
8 Claims. (Cl. 60—39.29)

The present invention relates to combustion gas turbine power plants of the type including at least one air compressor, one combustion chamber for supplying heat energy to the compressed air, and one gas turbine from which the power is delivered, and the principal object of the invention is to provide a power plant of this type which is able to satisfactorily take care of very large overloads.

Adjustable guide blading or impeller blading have long been used for the regulation of thermal current machines such as compressors and turbines. This makes it possible to vary the pressure-volume characteristic in a compressor notwithstanding a constant speed of rotation or the absorption capacity in a turbine. In this manner, the pressure level or the delivery volume of the compressor, or the energy output from the turbine can be easily adapted to meet whatever condition is required.

It is also known, for gas turbines, how to increase the actual output of the plant by introducing an auxiliary medium, preferably gaseous, into the working medium of the turbine. Such auxiliary medium can be steam, air or nitrogen, for example.

Knowledge of the above mentioned expedients is utilized, in accordance with the invention, for establishing an improved gas turbine plant in which, notwithstanding use of a compressor and gas turbine of a given normal output, a degree of extra output can be obtained which has not been heretofore possible. This is attained by means of two expedients, one such expendient being accommodation of at least one of the two thermal current machines, i.e. compressor or gas turbine, to the particular load of the plant, and the other expedient being the use of an additive medium which, in order to accommodate an overload, is admixed with the regular working medium after the latter leaves the air compressor.

The high, extra output to take care of overloads is obtained either by use of a compressor which is capable of being adapted to vary great variations in delivery volume or pressure level, or by use of a gas turbine having a variable flow cross-section.

Due to introduction of the additive medium into the regular working medium of the gas turbine, which may occur in the gas circuit before or after the combustion chamber, the gas flows through the turbine, and hence also the pressure ahead of the first row of blading increases, at constant pressure-volume characteristic of the air compressor. The pressure after the compressor is likewise increased and approaches the pump limit. The maximum permissible quantity of the additive medium is thereby limited. In order to be able to maintain this quantity as large as possible, the invention provides for keeping the normal operating point of the compressor far from the pump limit, for example, by increasing the otherwise necessary number of stages. That is to say, the compressor is over dimensioned for normal operation in supplying the normal load. The efficiency of the compressor will of course be reduced at the normal load operating point, and also the thermal efficiency of the entire plant will be reduced. However, this disadvantage is more than offset by the high gain in extra output which can be obtained whenever necessary to supply overload demands.

Another possibility resides in providing the air compressor with rotatably adjustable blading. Simultaneously with introduction of the additive medium, the blading is so adjusted that the delivery volume, and hence also the power absorption of the compressor, becomes smaller. The gas flow through the turbine becomes greater also, in this case, but it changes less than before. The increase in turbine output and the reduced energy requirement of the compressor again result in a high, extra amount of useful output. The regulation of the blade angle of the adjustable blading is preferably arranged so that the difference between the pressure at the compressor pump limit and the operating pressure does not fall below a certain permissible minimum value. This solution has the advantage that the air compressor operates at its optimum when the plant is operated without the additive medium.

Another possibility for carrying out the inventive concept lies in providing the gas turbine with adjustable blading. Simultaneously with the admixture of the additive medium, the angle of the blading is so adjusted that the flow cross-section of the turbine is enlarged. By this measure, the pressure ahead of the turbine remains approximately constant notwithstanding the increase in gas flow through the turbine. The gradient of the air compressor also remains unchanged, so that there is no danger of pumping. The gas turbine installation normally operates at its optimum point, i.e., the turbine and the compressor are under optimum load. The rotation of the turbine blading when introducing the additive medium also causes practically no variation in machine efficiencies.

The admixture of the additive medium into the normal working medium, by which is to be understood the compressed air as well as the hot combustion gases, may occur at any desired point between the air compressor and the gas turbine, but preferably takes place after the gases leave the combustion chamber if the additive medium is at a high temperature. If, however, the temperature of the additive medium is low, it is more advantageous to introduce it into the compressed air after leaving the compressor and to conduct this mixture to the combustion chamber. In this way one avoids cooling of the flame, as is the case is known arrangements wherein the additive medium is introduced directly into the combustion chamber. Moreover, the compressed air additive medium mixture may be used to cool the combustion chamber and the gas turbine. This permits increasing the temperature of the hot gases ahead of the turbine, which in combination with the previously mentioned possibilities, yields the greatest extra output of the gas turbine plant.

The foregoing as well as other objects and advantages of the invention will become more clearly understood from the following detailed description of two different embodiments thereof and from the accompanying drawings, in which:

FIG. 2 is a view similar to FIG. 1 but showing a variation in the plant layout; and FIGS. 3–5 are views showing details of the device by which the additive medium is admixed with the normal working medium.

Figure 1:
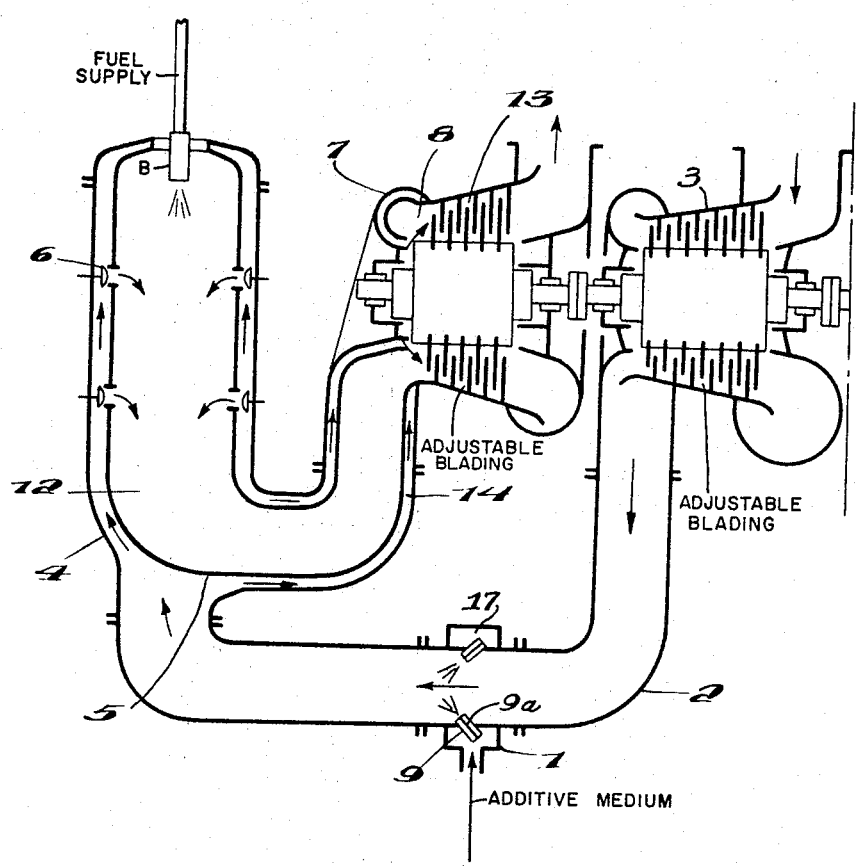
FIG. 1 is a somewhat schematic view of one embodiment of the invention.

With reference now to the drawings and to FIG. 1 in particular, the admixing device 1 is seen to be located in the duct 2 which connects the outlet from the compressor 3 with the inlet to combustion chamber 12. The mixture of compressed air, from compressor 3, and the additive medium introduced at the admixing device 1 into duct 2 through an array of nozzles 9 located in a plenum chamber 17 surrounding duct 2, flows between the outer wall 4 of the combustion chamber and the inner wall 5 thereof which defines the combustion zone. Thus the admixture cools this inner wall before it passes through apertures 6 below the flame from fuel burner B into the combustion zone where combustion takes place. In like manner, the mixture also serves to cool the walls of the gas inlet 7 to the gas turbine 13, and also the turbine rotor and blading as indicated by the arrows 8.

On the other hand, it may be desired to cool the walls of the turbine inlet 7, and possibly the rotor and blading of turbine 13 predominantly with the additive medium itself. A suitable arrangement for this is illustrated in the modified construction according to FIG. 2 wherein an additional admixing device for the additive medium indicated at 10 is seen to be located in the coolant path through the double wall duct connection 14 between combustion chamber 12 and turbine inlet 7. This additional mixing device includes a plenum chamber 17' surrounding the double wall duct connection 14 from which the additive medium is discharged from an array of nozzles 9' into the space defined between these double walls.

In the gas turbine plants illustrated in FIGS. 1 and 2, the air required for combustion is taken from the mixture of compressed air and the additive medium. If, because of introduction of the additive medium into the duct 2, the oxygen content of the mixture is reduced too much, which would result in a poorer combustion, there can be provided, according to FIG. 2, a separate air admission point 15 to the burner B which comes directly for compressor 3, as shown, or is branched off from the air duct 2. Logically, the admixture of the additive medium must occur only after the combustion air has been taken out. If, in order to increase the temperature of the combustion gases, more fuel is to be supplied in the process, a shortage of oxygen may occur sooner. In such case it is advantageous to provide an adjustable throttle valve 16 as shown in FIG. 2, in the air duct 2 after the tapping point for combustion air supplied via duct 15 to the burner for the combustion chamber. When throttling air with valve 16 more combustion air is thus supplied direct to the burner of combustion chamber 12.

In order to make certain of a very uniform introduction of the additive medium, an adjustable device is provided whereby the injecting direction can be changed without using a different nozzle. This is shown in FIGS. 3–5. With reference now to these views it will be seen that a plurality of nozzles 9 are arranged in circumferentially spaced relation around the periphery of a partition member 11 having a frusto-conical configuration, and which has a nose or point angle of 90°. To simplify the drawing in FIG. 3 only two diametrically opposite nozzles have been included. Each of the nozzles 9 is provided with a through bore 9a which is located along an axis $x-x'$ that lies at a 45° angle to a transverse axis $y-y'$ of the nozzle body. By a simple rotation of the nozzle body 9 about axis $y-y'$, it is thus possible to adjust the angle at which the additive medium discharged from the bore 9a enters the air stream flowing in the direction indicated by the arrow F. The additive medium enters the nozzles 9 from a plenum chamber 17. In FIGS. 3 and 4, the entry angle of the additive medium is 0°, i.e., the additive medium is discharged from nozzles 9 in the same direction as the air flow F. In FIG. 5, the nozzle 9 has been rotated about axis $y-y'$ such that the discharge from the nozzle intersects the air stream at an angle of 90°. As soon as the correct injection angle is determined, it suffices to prevent any further rotation of the nozzles and the latter can then be fixed in the proper position such as by welding. The same arrangement can be employed when the injection of the additive medium takes place in a counter current manner relative to the air flow.

In conclusion, while preferred embodiments of the invention have been described and illustrated, it will be evident that various modifications can be made in the construction and arrangement of the component parts without, however, departing from the spirit and scope of the invention as defined in the appended claims.

We claim:

1. In a combustion gas turbine plant which comprises an air compressor, a gas turbine which drives said compressor and also furnishes additional power to drive a useful load, and a combustion chamber including fuel supply means located intermediate the output from said compressor and the input to said gas turbine with passage means for receiving air from said compressor and delivering combustion gas to said turbine, an arrangement for increasing the useful output from said plant to carry an overload imposed upon the same which comprises regulating means for decreasing the amount of compressed air delivered by said compressor and effecting a corresponding decrease in its required power input and other supply means for simultaneously supplying an additive working medium to the main working medium in advance of the inlet to said turbine.

2. The arrangement as defined in claim 1 for increasing the output of a gas turbine plant to carry an overload wherein said compressor is provided with adjustable blading serving as said regulating means and the amount of compressed air delivered by said compressor is decreased by changing the angle of its blading.

3. The arrangement as defined in claim 1 for increasing the output of a gas turbine plant to carry an overloading and which further includes adjustable means for increasing the absorption capacity of said turbine to accommodate an increase in the total amount of working medium put through the turbine.

4. The arrangement as defined in claim 1 for increasing the output of a gas turbine plant to carry an overload wherein the compressor is provided with adjustable blading serving as said regulating means and the turbine is provided with adjustable blading and the amount of compressed air delivered by the compressor is decreased by changing the angle of its blading, and the absorption capacity of the turbine is simultaneously increased by changing the angle of its blading to accommodate an increase in the total amount of working medium put through the turbine.

5. The arrangement as defined in claim 1 for increasing the output of a gas turbine plant to carry an overload wherein said additive working medium is via said other supply means admixed with the compressed air discharged from said compressor.

6. The arrangement as defined in claim 1 for increasing the output of a gas turbine plant to carry an overload wherein said additive working medium is via said other supply means admixed with the compressed air discharged from said compressor and in advance of delivery of the compressed air to said combustion chamber.

7. The arrangement as defined in claim 1 for increasing the output of a gas turbine plant to carry an overload wherein a portion of said additive working medium is via said other supply means admixed with the compressed air discharged from said compressor in advance of delivery of the compressed air to said combustion chamber and wherein a further portion of said additive working medium is delivered via additional supply means directly to the inlet to said turbine.

8. The arrangement as defined in claim 1 for increasing the output of a gas turbine plant to carry an overload and which further includes additional passage means for delivering an adjustable amount of the total compressed air discharge from said compressor directly to said combustion chamber without passing through said first passage means and without being admixed with said additive working medium.

References Cited by the Examiner

UNITED STATES PATENTS

| | | | |
|---|---|---|---|
| 2,168,313 | 8/1939 | Bichowsky | 60—39.55 |
| 2,217,649 | 10/1940 | Goddard | 60—39.74 X |
| 2,551,229 | 5/1951 | Alford et al. | 60—35.6 |
| 2,651,496 | 9/1953 | Buckland et al. | 253—155 X |
| 2,946,521 | 7/1960 | McEachern | 239—547 |
| 2,960,823 | 11/1960 | Fox | 60—39.06 |
| 3,133,416 | 5/1964 | Mock | 60—39.29 X |
| 3,142,154 | 7/1964 | Leeson | 60—39.29 X |
| 3,142,155 | 7/1964 | Levesque et al. | 60—39.66 |

JULIUS E. WEST, *Primary Examiner.*